United States Patent [19]

Song

[11] Patent Number: 5,633,470
[45] Date of Patent: May 27, 1997

[54] VELOCITY AND HOLDUP DETERMINATION METHOD FOR STRATIFIED GAS-LIQUID FLOW IN HIGHLY INCLINED CONDUITS

[75] Inventor: Shanhong Song, Houston, Tex.

[73] Assignee: Western Atlas International, Inc., Houston, Tex.

[21] Appl. No.: 556,736

[22] Filed: Nov. 7, 1995

[51] Int. Cl.$^6$ .............................. G01F 1/68; G21B 47/00
[52] U.S. Cl. ....................... 73/861.04; 73/152.42
[58] Field of Search ............................ 73/861.04, 152.18, 73/152.29, 152.31, 152.33, 152.42, 861.95

[56] References Cited

U.S. PATENT DOCUMENTS

| | | | |
|---|---|---|---|
| 4,441,362 | 4/1984 | Carlson | 73/152.42 |
| 5,396,807 | 3/1995 | Dowty et al. | 73/861.04 |

*Primary Examiner*—Richard Chilcot
*Assistant Examiner*—Harshad Patel
*Attorney, Agent, or Firm*—Richard A. Fagin

[57] ABSTRACT

A method of determining volumetric flow rates of gas and liquid in a highly inclined conduit. The method includes measuring the velocity the gas, measuring the velocity of the liquid, calculating a fractional amount of the cross-sectional area of the conduit occupied by the gas and occupied by the liquid, and calculating the volumetric flow rates from the measurements of velocity and from the calculated fractional amounts of the cross-sectional area of the conduit occupied by the gas and by the liquid. In a preferred embodiment, the gas velocity is measured by cross-correlating measurements of two spaced apart temperature sensors after momentarily heating the gas. In the preferred embodiment, the liquid velocity is measured by a spinner flowmeter.

16 Claims, 2 Drawing Sheets

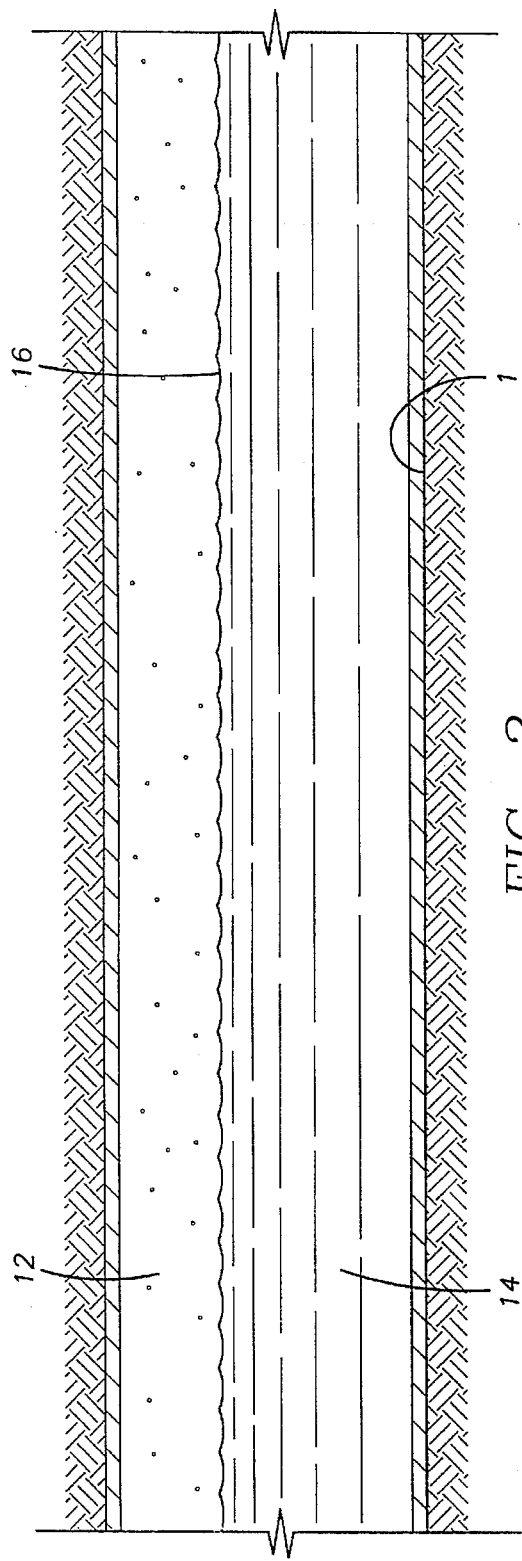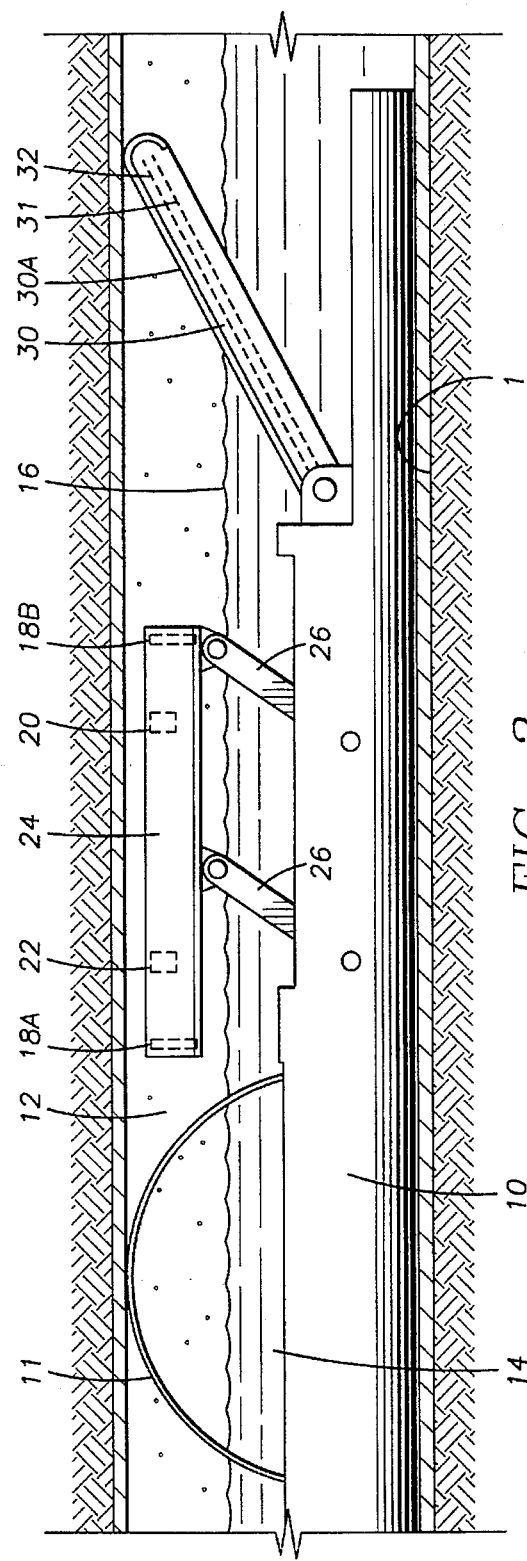

VELOCITY AND HOLDUP DETERMINATION METHOD FOR STRATIFIED GAS-LIQUID FLOW IN HIGHLY INCLINED CONDUITS

BACKGROUND OF THE INVENTION

1. Field of the Invention

The present invention is related to the field of production logging of oil and gas wells. More specifically, the present invention is related to methods of determining volumetric flow rates of gas and liquid in highly inclined wellbores particularly when the flow regime substantially consists of stratified gas-liquid flow.

2. Description of the Related Art

It is desirable for the operator of an oil and gas well to be able to determine, with respect to depth in the wellbore, flow rates of various fluids flowing within the wellbore. The fluids typically include oil, gas and water. The wellbore operator uses knowledge of the flow rates of the fluids to determine, among other things, which subsurface earth formations introduce the fluids into the wellbore which are desired to be produced, typically the gas and/or oil, and which formations introduce fluid, typically water, which interferes with the intended fluid production of the wellbore.

Production logging of oil and gas wells is used to determine, with respect to depth, the flow rates of the various fluids flowing within the wellbore. Production logging includes lowering instruments into the wellbore at one end of an armored electrical cable. The instruments communicate signals along the cable to a recording system at the earth's surface wherein the instrument signals are converted into measurements corresponding to the flow rates of the fluids in the wellbore with respect to dept. The instruments typically include a device which measures fluid pressure, a device which measures specific gravity of the fluid in the wellbore, another device which is used to determine the fractional volume of water in the wellbore, and another device selected from a number of different types of such device which measures the velocity of the fluid flowing in the wellbore. As is understood by those skilled in the art, production logging instruments typically measure properties of the fluids in the wellbore only within a very small fraction of the total cross-sectional area of the wellbore. In vertical wellbores this limitation of production logging instruments typically does not pose any difficulty in determining volumetric flow rates of the individual fluids because fluid flow is typically sufficiently homogeneous to enable the response of the production logging instrument to reflect the bulk composition of the fluid. However, in highly inclined or horizontal wellbores, the fluids in the wellbore can segregate by gravity so that the less dense fluids fill the upper portion of the cross-sectional area of the wellbore and more dense fluids fill the lower portions of the cross-section of the wellbore. Gravity segregation may cause the production logging instruments to make measurements corresponding to the density, velocity, and fractional volume of only one of the fluids, depending on the fraction of the cross-section of the wellbore filled with each individual fluid, and on the position of the production logging instrument within the cross-section of the wellbore.

A particularly difficult flow condition to measure in highly inclined wellbores using the production logging tools known in the art is so-called stratified flow, in which the fluids in the wellbore comprise gas and liquid. Gas typically will occupy the upper portion of the wellbore, and the liquid will occupy the lower portion. In order for the wellbore operator to determine the volumetric flow rates of gas and liquid flowing in such a wellbore, he must be able to determine gas velocity, liquid velocity and the fractional amount of the wellbore cross-section occupied by each. Because the production logging tools known in the art measure fluid properties at only a small fraction of the total cross-sectional area of the wellbore, it is difficult to determine the fraction of the cross-sectional area and the velocities of gas and liquid using production logging instruments and methods known in the art.

Accordingly, it is an object of the present invention to provide a method of determining flow rates of stratified gas and liquid in a highly inclined wellbore in which it is not necessary to measure all three parameters: gas velocity, liquid velocity and fractional volume of each within the wellbore.

SUMMARY OF THE INVENTION

The present invention is a method of determining volumetric flow rates of gas and liquid in a highly inclined conduit. The method includes the steps of measuring the velocity of the gas, measuring the velocity of the liquid, calculating a fractional amount of the cross-sectional area of the conduit occupied by the gas and by the liquid, and calculating the volumetric flow rates from the measurements of velocity and from the calculated fractional amounts of the cross-sectional area of the conduit occupied by the gas and by the liquid.

In a preferred embodiment of the invention, the gas velocity is measured by cross-correlating measurements of two spaced apart temperature sensors after momentarily heating the gas. The gas velocity is inversely related to the time delay between measurements of the heated gas passing each sensor. The liquid velocity is measured by a spinner flowmeter.

Alternatively, the liquid velocity can be measured by a radioactive tracer.

BRIEF DESCRIPTION OF THE DRAWINGS

FIG. 2 shows stratified flow in the wellbore comprising liquid and gas segregated by gravity.

FIG. 3 shows a gas velocity measurement sensor forming part of the production logging tool.

DESCRIPTION OF THE PREFERRED EMBODIMENT

Figure 1:
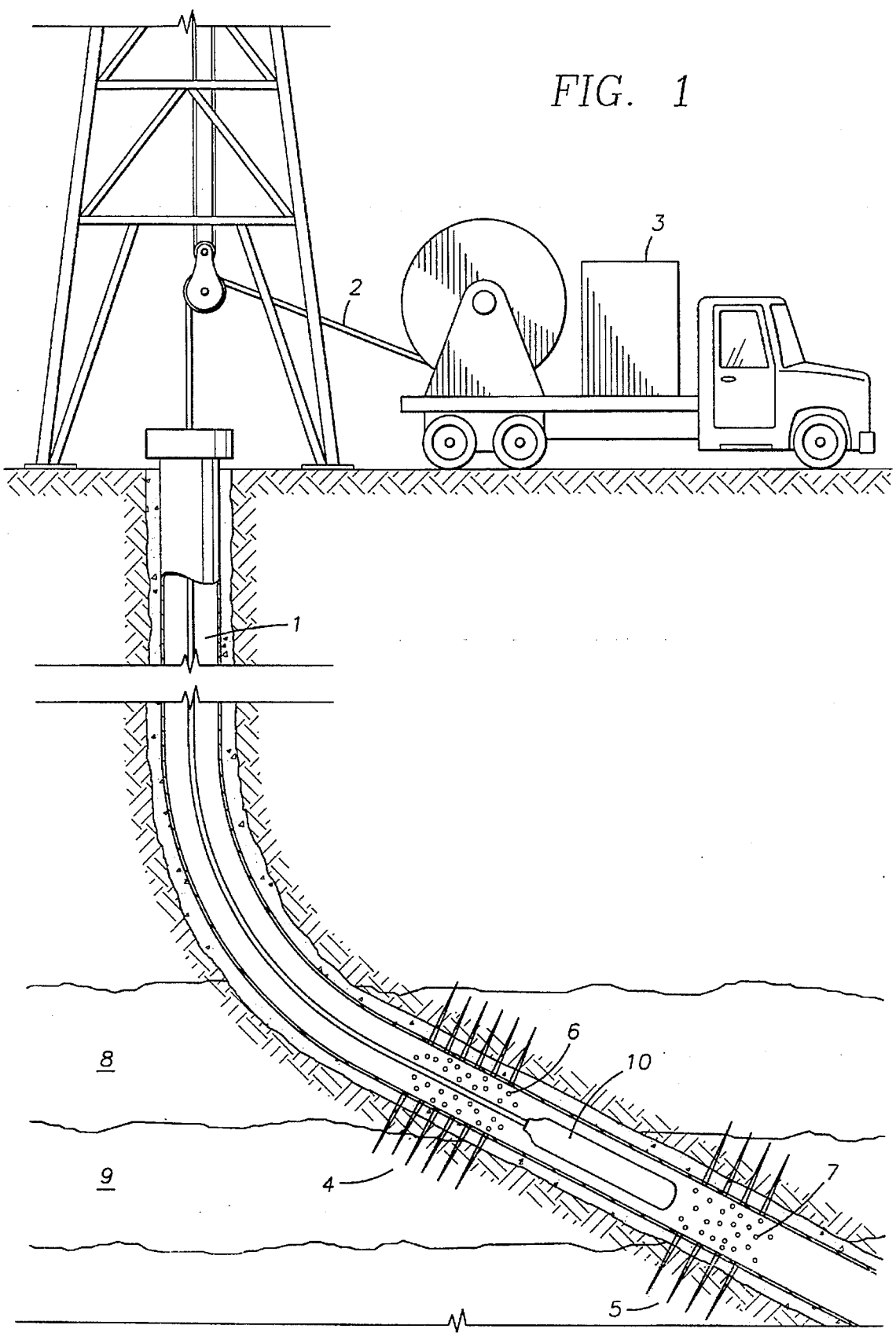
FIG. 1 shows a production logging tool according to the present invention being lowered into a wellbore.

Operation of the present invention in a wellbore can be better understood by referring to FIG. 1. An electric wireline or cable 2 typically comprising at least one insulated electrical conductor (not shown separately) can be extended into a wellbore 1 by means of a surface logging unit 3 comprising a winch (not shown separately) or similar device known in the art. A logging tool 10 comprising an instrument for measuring gas velocity and liquid velocity (not shown separately in FIG. 1) can be attached to the end of the cable 2 which is extended into the wellbore 1. The logging unit 3 further comprises equipment (not shown separately) for sending electrical power to the tool 10, and receiving and interpreting signals transmitted along the cable 2 by the tool 10. The signals transmitted by the tool 10 correspond to, among other things, the gas velocity and liquid velocity. The use of the measurements of gas velocity and liquid velocity will be further explained.

A first zone 4 can be completed in an upper earth formation 8, and a second zone 5 can be completed in a lower earth formation 9. Each zone 4, 5 provides hydraulic communication between the respective earth formations 8, 9 and the wellbore 1. A first fluid 6 contained in the upper earth formation 8, and a second fluid 7 (which may be of different overall composition than the first fluid 6) contained in the lower earth formation 9, can flow into the wellbore 1. As the tool 10 is moved past the zones 4, 5, the tool 10 makes measurements corresponding to the relative volumes of the first 6 and second 7 fluids entering the wellbore 1 from the upper 8 and lower 9 earth formations, respectively, as will be further explained. To use the present invention, the wellbore 1 typically should be inclined less than about ten degrees from horizontal at the depth at which the first formation 8 and the second formation 9 are located.

Principle of measurement of the present invention

FIG. 2 shows a section of the wellbore 1 which is substantially horizontal. Gas 12 and liquid 14 are flowing in the section of the wellbore 1 in a manner referred to as stratified flow. The liquid 14 in FIG. 2 can be water, but it is to be understood that the present invention is also applicable when the liquid 14 comprises oil, or mixtures of water and oil. Stratified flow typically occurs when the flowing velocity is low enough so as not to disturb substantially an interface 16 between the gas 12 and the liquid 14. The gas 12, being less dense than the liquid 14, segregates by gravity and tends to travel through the upper portion of the cross-sectional area of the wellbore 1. In the present invention, undetermined volumetric flow rates of gas and of liquid can enter the wellbore 1 from the first zone (shown as 4 in FIG. 1) and from the second zone (shown as 5 in FIG. 1). The volumetric flow rates at which the gas and liquid enter the wellbore 1 from each zone (4, 5) determine the overall velocity of the gas 12, the overall velocity of the liquid 14 and the fractional amount of the cross-section of the wellbore 1 which is occupied by the gas 12 and by the liquid 14.

The following analysis is provided to show that, assuming stratified flow, it is possible to determine the fractional amount of the cross-sectional area of the wellbore occupied by the gas 12 and the liquid 14 only by measuring gas 12 velocity and liquid 14 velocity. By determining the fractional amount of the cross-section and combining it with the velocity measurements, it is therefore possible to determine volumetric flow rates of the gas 12 and the liquid 14 only by measuring their respective velocities. It is to be understood that using the following analysis, it is also possible to determine either the gas 12 velocity or the liquid 14 velocity by measuring the fractional amount of cross-section occupied by either one, and measuring the other velocity.

At any particular axial position within the section of the wellbore 1, if the flow rates of the gas 12 and of the liquid 14 are assumed to be substantially constant, then the momentum of the liquid 14 can be described according to the following expression:

$$\left(P + \rho_l g \frac{h}{2}\right) A_l - \left(P + \rho_l g \frac{h}{2} + \frac{dp}{dx} \Delta x\right) A_l + \tau_i s_i \Delta x - \tau_l s_l \Delta x + \rho_l A_l \Delta x g (\sin\alpha) = 0 \quad (1)$$

where P represents the gas 12 pressure, h represents the liquid 14 depth, $A_l$ represents the cross-sectional area within the wellbore 1 occupied by the liquid 14, g represents acceleration due to gravity (the gravitational constant, typically about 9.81 cm/sec$^2$), α represents the angle of inclination of the wellbore 1 with respect to horizontal (when the wellbore 1 is horizontal α=0), $\rho_l$ represents the density of the liquid 14, $\tau_l$ and $\tau_i$ represent, respectively, the shear stresses within the liquid 14 and at the interface 16. $s_i$ represents the length of the interface 16, and $s_l$ represents the perimeter of the wellbore 1 occupied by the liquid 14. dp/dx represents the fluid pressure gradient along the wellbore 1 and Δx represents the length of the wellbore 1 over which the momentum is being calculated. The density of the liquid 14 can be determined by surface measurement, particularly if the liquid 14 consists substantially entirely of water. Alternatively, the liquid 14 density can be measured by a fluid density measuring device forming part of the production logging tool (10 in FIG. 1), as is known in the art.

Equation (1) can be simplified to the form:

$$-A_l \frac{dp}{dx} + \tau_i s_i - \tau_l s_l + \rho_l g A_l (\sin\alpha) = 0 \quad (2)$$

In equations (1) and (2) a so-called "shallow water" approximation is used. Therefore the liquid 14 pressure in the segment of the wellbore 1 can be expressed as:

$$P_l = P + \rho_l g \frac{h}{2} \quad (3)$$

The momentum of the gas 12 can be described by the following expression:

$$-A_g \frac{dp}{dx} - \tau_i s_i - \tau_g s_g + \rho_g g A_g (\sin\alpha) = 0 \quad (4)$$

In equation (4) all the "g" subscript variables represent the equivalent quantities for the gas 12 as for the liquid 14 in equations (1) and (2). The gas 12 density can be directly measured by using the fluid density device forming part of the production logging tool (10 in FIG. 1). Alternatively the gas 12 density can be calculated by measuring the density of an actual sample of the gas 12 at surface pressure and temperature conditions. The density of the gas at the temperature and pressure conditions in the wellbore can then be calculated by measuring the pressure and temperature in the wellbore 1 using appropriate pressure and temperature sensors (of types known in the art) on the production logging tool (10 in FIG. 1), and converting the gas 12 density measured at the earth's surface temperature and pressure to the pressure and temperature measured in the wellbore 1. The gas 12 density conversion method is known to those skilled in the art.

By combining equations (2) and (4) the pressure terms can be eliminated from the result, giving the expression:

$$\tau_g \frac{s_g}{A_g} - \tau_l \frac{s_l}{A_l} + \tau_i s_i \left(\frac{1}{A_g} + \frac{1}{A_l}\right) + (\rho_l - \rho_g)\sin\alpha = 0 \quad (5)$$

The shear stress terms in the preceding equations can be determined by the following expressions:

$$\tau_l = f_l \frac{\rho_l}{2} V_l^2 \quad (6)$$

$$\tau_g = f_g \frac{\rho_g}{2} V_g^2 \quad (7)$$

$$\tau_i = f_i \frac{\rho_g}{2} (V_g - V_l)^2 \quad (8)$$

where the $f$ terms, referred to as friction factors, can be determined by the following expressions:

$$f_l = c \left(\frac{D_l V_l}{v_l}\right)^b \; ; f_i = f_g = c \left(\frac{D_g V_g}{v_g}\right)^b \quad (9)$$

where $v_g$ and $v_l$ represent, respectively, the gas 12 and liquid 14 kinematic viscosities. In equation (9), c is a constant typically having a value of about 16.0 for laminar flow and 0.046 for turbulent flow. b is a constant typically having a value of about −1.0 for laminar flow and a value of −0.2 for turbulent flow. Hydraulic diameters, $D_l$, and $D_g$ in equation (9), are typically defined according to the following expressions:

$$D_l = \frac{4A_l}{s_l} \; ; D_g = \frac{4A_g}{s_g + s_i} \qquad (10)$$

It is assumed in the foregoing analysis of stratified flow that the gas 12 velocity is typically greater than the liquid 14 velocity. If instead the liquid 14 flows at higher velocity than the gas 12, then the friction factor term for the gas/liquid interface 16 will have the opposite sign. A general expression relating gas 12 velocity, liquid 14 velocity and cross-sectional area within the wellbore 1 occupied by the gas 12 and the liquid 14 can be shown by the following expression:

$$\tau_g \frac{s_g}{A_g} - \tau_l \frac{s_l}{A_l} \pm \tau_i s_i \left( \frac{1}{A_g} - \frac{1}{A_l} \right) + (\rho_l - \rho_g) \sin \alpha = 0 \qquad (11)$$

If the interface friction factor term in equation (11) is positive, then the gas 12 has the higher velocity. If the friction factor term is negative, then the liquid 14 has the higher velocity.

As is understood by those skilled in the art, knowledge of all three principal variables, gas 12 velocity, liquid 14 velocity, and fractional amount of the cross-sectional area of the wellbore 1 occupied by the gas 12 and by the liquid 14, is needed to determine the volumetric flow rates of fluids entering the wellbore 1 from each one of the zones (shown as 4 and 5 in FIG. 1). By using the relationship described in equation (11), it is possible to determine any one of the three principal variables only by measuring the other two variables. For example, fractional amount of the cross-section of the wellbore 1 occupied by the gas 12 and by the liquid 14 can be determined simply by determining the gas 12 velocity and the liquid 14 velocity. The fractional amount of the cross-section of the wellbore 1 can be determined according to equation (11), and the volumetric flow rates of each of the gas 12 and of liquid 14 can thereby be determined.

A gas velocity sensor for use with the production logging tool of the present invention Referring now to FIG. 3, a preferred sensor for determining the gas velocity will be explained. A sensor housing 24 can be attached to the production logging tool 10 at the end of an extensible linkage 26. In the portion of the wellbore 1 which is substantially horizontal, as is understood by those skilled in the art, the tool 10 typically will be positioned along the bottom side of the wellbore 1 due to gravity. It is preferable to provide the tool 10 with a bowspring 11 or similar eccentering device so that the tool 10 is rotationally oriented to have the sensor housing 24 extend towards the top wall of the wellbore 1 when the linkage 26 is extended. The linkage 26 can be of a type familiar to those skilled in the art. The sensor housing 24 includes two temperature sensors 20, 22 positioned at a predetermined spacing from each other along the housing 24. Heating elements, which can be electrical resistance type heaters, shown at 18A and 18B can be positioned at each end of the housing 24. The heating elements 18A and 18B can be periodically energized with pulses of electrical power generated by control circuits (not shown) in the tool 10. The gas 12 in contact with the element 18A or 18B, energized when the power pulse is applied thereto, will be slightly elevated in temperature. Depending on the gas 12 velocity, the heated gas 12 will travel so that it momentarily raises the temperature of one of the sensors 20 or 22, and then after a time delay raises the temperature momentarily of the other sensor 22 or 20. Two heating elements, 18A and 18B, are provided to allow for the possibility that the velocity of the tool 10 relative to the velocity of the gas 12 can cause the heated gas 12 to move in either direction relative to the two sensors 20, 22. The gas 12 velocity can be determined by measuring the time delay between the momentary temperature increases at one sensor 20 and then the other 22, and dividing the time delay by the predetermined distance between the sensors 20, 22. As is understood by those skilled in the art, determining the time delay is preferably performed by cross-correlating temperature measurements of the two sensors 20, 22 and determining a value of time delay X at which the correlation value $R_{xy}$ reaches a maximum. This process can be described by the expression:

$$R_{xy}(\chi) = \lim \frac{1}{T} \int x(t) y(t + \chi) dt \qquad (12)$$

where x(t) and y(t) represent the measurements from each temperature sensor 20, 22 with respect to time.

It is to be understood that other instruments known in the art, such as spinner flowmeters (not shown), can be used to determine gas 12 velocity. The sensor shown herein provides particular advantages in measuring very low gas 12 velocities, but the sensor shown herein is not to be construed as a limitation on the invention.

The liquid 14 velocity can be determined by using any one of a number of instruments familiar to those skilled in the art, for example, a spinner type flowmeter (not shown) for higher liquid 14 velocities, or a radioactive tracer ejector/detector (not shown) for lower liquid 14 velocities.

Densities of the gas 12 and the liquid 14 can be determined by calculation from densities measured at the earth's surface converted to the temperature and pressure in the wellbore 1, or alternatively, can be measured using a fluid density instrument (not shown) of a type familiar to those skilled in the art.

DESCRIPTION OF AN ALTERNATIVE EMBODIMENT

From the analysis of fluid flow momentum described in the first embodiment of the invention, it is apparent that it is also possible to determine volumetric flow rates of the gas (12 in FIG. 2) and the liquid (14 in FIG. 2) by measuring either the gas 12 velocity or the liquid 14 velocity, and the fractional amount of the cross-sectional area of the wellbore (1 in FIG. 2) which is occupied by the gas 12 and by the liquid 14. Since the manner of fluid flow (the "flow regime") in the present invention is typically stratified flow, wherein the interface (16 in FIG. 2) is substantially undisturbed, the fractional amount of the cross-sectional area of the wellbore 1 occupied by the gas 12 and by the liquid 14 can be determined by measurement of the liquid 14 depth. An apparatus for measuring liquid 14 depth can be observed by referring once again to FIG. 3. A capacitance sensor arm 30 can be pivotally attached to the production logging instrument 10. The sensor arm 30 is preferably pivotally attached so that it radially extends from the tool 10 substantially in the same direction as the gas velocity sensor housing 24. The sensor arm 30 can include a mechanism (not shown) of a type familiar to those skilled in the art for selectively radially extending the sensor arm 30 so that it contacts the upper wall of the wellbore 10. The sensor arm 30 preferably includes an electrically insulating surface 30A upon which are disposed two parallel electrodes 31, 32 extending substantially the entire length of the arm 30. The electrodes 31, 31 can be electrically connected to a circuit (not shown) in the tool 10 which generates a signal proportional to the capacitance between the electrodes 31, 32. As is understood by those skilled in the art, the capacitance between the electrodes 31, 32 depends on the dielectric properties of the fluid in contact with the electrodes 31, 32. The liquid 14, which is likely to comprise at least a slight fractional volume of water, typically has substantially different dielectric properties than the gas 12. The capacitance between the electrodes 31, 32 will typically be directly related to the liquid 14 level in the wellbore 1. Using a sensor arm 30 as shown in FIG. 3, it is possible to determine volumetric flow rates of the liquid 14 and the gas 12 by measuring gas 12 velocity and liquid 14 level, and then solving equation (11) to determine the liquid 14 velocity. It is also possible to measure liquid 14 level using an apparatus similar to the one shown in FIG. 3, and to measure the liquid 14 velocity using the previously described spinner flowmeter (not shown) or radioactive tracer apparatus (not shown). Equation (11) can then be solved to determine gas 12 velocity.

The system disclosed herein provides the wellbore operator with system for determining volumetric flow rates of stratified gas/liquid flow in horizontal wellbores without the need to measure all three of the gas velocity, the liquid velocity and the fractional amount of the cross-section of the wellbore occupied by each.

Those skilled in the art will devise modifications and improvements to the present invention without departing from the spirit of the invention. The present invention should therefore be limited only by the claims appended hereto.

What is claimed is:

1. A method of determining volumetric flow rates of gas and liquid in a highly inclined conduit wherein said gas and said liquid comprise substantially stratified flow, said method comprising the steps of:

measuring a velocity of said gas;

measuring a velocity of said liquid;

calculating a fractional amount of cross-sectional area of said conduit occupied by said gas and by said liquid; and calculating said volumetric flow rates from said velocity measurements and from said calculated fractional amounts of said cross-sectional area.

2. The method as defined in claim 1 wherein said step of measuring said velocity of said gas comprises cross-correlating spaced apart temperature sensor measurements after momentarily heating said gas to determine a time delay of travel of the heated gas between said temperature sensors.

3. The method as defined in claim 1 wherein said step of measuring said velocity of said gas comprises inserting a spinner flowmeter into said gas.

4. The method as defined in claim 1 wherein said step of measuring said velocity of said liquid comprises inserting a spinner flowmeter into said liquid.

5. The method as defined in claim 1 wherein said step of measuring said velocity of said liquid comprises measuring movement time of a radioactive tracer.

6. The method as defined in claim 1 further comprising measuring density of said liquid using a fluid density instrument.

7. The method as defined in claim 1 further comprising determining density of said gas by measuring pressure and temperature of said gas in said conduit and converting a surface measurement of said gas to said measured temperature and pressure.

8. The method as defined in claim 1 wherein said liquid comprises water.

9. The method as defined in claim 1 wherein said liquid comprises a mixture of oil and water.

10. A method of determining volumetric flow rates of gas and liquid in a highly inclined conduit wherein said gas and said liquid comprise substantially stratified flow, said method comprising the steps of:

measuring a velocity of said gas;

measuring a level of said liquid within said conduit;

calculating a fractional amount of cross-sectional area of said conduit occupied by said gas and by said liquid;

calculating a velocity of said liquid; and calculating said volumetric flow rates from said gas velocity measurement and from said calculated fractional amounts of said cross-sectional area and calculated liquid velocity.

11. The method as defined in claim 10 wherein said step of measuring said velocity of said gas comprises cross-correlating spaced apart temperature sensor measurements after momentarily heating said gas to determine a time delay of travel of the heated gas between said temperature sensors.

12. The method as defined in claim 10 wherein said step of measuring said liquid level comprises measuring electrical capacitance across said conduit.

13. A method of determining volumetric flow rates of gas and liquid in a highly inclined conduit wherein said gas and said liquid comprise substantially stratified flow, said method comprising the steps of:

measuring a velocity of said liquid;

measuring a level of said liquid within said conduit;

calculating a fractional amount of cross-sectional area of said conduit occupied by said gas and by said liquid;

calculating a velocity of said gas; and calculating said volumetric flow rates from said liquid velocity measurement and from said calculated fractional amounts of said cross-sectional area and calculated gas velocity.

14. The method as defined in claim 13 wherein said step of measuring said velocity of said liquid comprises inserting a spinner flowmeter into said liquid.

15. The method as defined in claim 13 wherein said step of measuring said velocity of said liquid comprises measuring movement time of a radioactive tracer.

16. The method as defined in claim 13 wherein said step of measuring said liquid level comprises measuring electrical capacitance across said conduit.

* * * * *